(12) United States Patent
Li et al.

(10) Patent No.: US 11,085,576 B2
(45) Date of Patent: Aug. 10, 2021

(54) MULTIFUNCTIONAL SUPPORT BRACKET AND AN ASSEMBLY THEREOF

(71) Applicant: GUANGDONG SIRUI OPTICAL CO., LTD., Zhongshan (CN)

(72) Inventors: Jie Li, Zhongshan (CN); Xiaoyun Hu, Zhongshan (CN)

(73) Assignee: GUANGDONG SIRUI OPTICAL CO., LTD., Zhongshan (CN)

( * ) Notice: Subject to any disclaimer, the term of this patent is extended or adjusted under 35 U.S.C. 154(b) by 0 days.

(21) Appl. No.: 15/757,359

(22) PCT Filed: Dec. 18, 2017

(86) PCT No.: PCT/CN2017/116919
§ 371 (c)(1),
(2) Date: Mar. 3, 2018

(87) PCT Pub. No.: WO2019/109382
PCT Pub. Date: Jun. 13, 2019

(65) Prior Publication Data
US 2020/0292124 A1    Sep. 17, 2020

(30) Foreign Application Priority Data
Dec. 4, 2017    (CN) .......................... 201711261155.0

(51) Int. Cl.
*F16M 11/16*    (2006.01)
*F16M 11/32*    (2006.01)
*G03B 17/56*    (2021.01)

(52) U.S. Cl.
CPC ............. *F16M 11/16* (2013.01); *F16M 11/32* (2013.01); *F16M 2200/022* (2013.01); *G03B 17/561* (2013.01)

(58) Field of Classification Search
CPC ........ F16M 11/16; F16M 11/32; F16M 11/14; F16M 2200/022; G03B 17/561
See application file for complete search history.

(56) References Cited

U.S. PATENT DOCUMENTS

| 362,384 A | 5/1887 | Johnson | |
|---|---|---|---|
| 1,794,726 A * | 3/1931 | Mitchell | F16M 11/126 248/181.1 |

(Continued)

FOREIGN PATENT DOCUMENTS

| CN | 201788348 U | 4/2011 |
|---|---|---|
| CN | 104389887 A | 3/2015 |

(Continued)

OTHER PUBLICATIONS

Extended European Search Report dated Feb. 15, 2019 for CN2017116919 (pp. 1-9).

(Continued)

*Primary Examiner* — Anita M King
(74) *Attorney, Agent, or Firm* — Loeb & Loeb, LLP

(57) ABSTRACT

An auxiliary device for photo-taking and video-taking and a multifunctional support bracket. A spherical base, arranged on an upper part of the main body, includes a spherical concave shape with an upward-facing opening and provides a cooperation member for being fixedly connected to a spherical-bottomed ball head. A flat-bottomed platform, with one side face detachably fixed to the opening of the spherical base through the cooperation member, has the other side face provided with a connection member for being fixedly connected to a flat-bottomed ball head. A flat-bottomed ball head, fixedly connectable to the connection member of the flat-bottomed platform. A spherical-bottomed ball head, for being fixed in the spherical base after the flat-bottomed platform is removed, and detachably fixedly connected to the cooperation member of the spherical base.

(Continued)

The multifunctional support bracket and the assembly thereof may be applied to both flat-bottomed ball head and spherical-bottomed ball head.

16 Claims, 8 Drawing Sheets

(56) References Cited

U.S. PATENT DOCUMENTS

| | | | | |
|---|---|---|---|---|
| 2,496,986 | A | * 2/1950 | Coutant | F16M 11/242 |
| | | | | 248/168 |
| 2,572,468 | A | * 10/1951 | Gibson | F16M 11/16 |
| | | | | 248/181.2 |
| 4,066,231 | A | * 1/1978 | Bahner | B43M 99/00 |
| | | | | 248/289.11 |
| 4,929,973 | A | * 5/1990 | Nakatani | F16M 11/041 |
| | | | | 248/177.1 |
| 5,222,826 | A | * 6/1993 | Hanke | F16M 11/041 |
| | | | | 403/381 |
| 5,871,186 | A | * 2/1999 | Bothe | F16C 11/069 |
| | | | | 248/178.1 |
| 2005/0045783 | A1 | 3/2005 | Brumley | |
| 2005/0151036 | A1* | 7/2005 | Speggiorin | F16M 11/32 |
| | | | | 248/177.1 |
| 2007/0090237 | A1* | 4/2007 | Hsu | F16M 11/16 |
| | | | | 248/178.1 |

FOREIGN PATENT DOCUMENTS

| | | |
|---|---|---|
| CN | 206656095 U | 11/2017 |
| CN | 207716019 U | 8/2018 |
| DE | 3148390 A1 | 6/1983 |
| DE | 19850746 A1 | 5/2000 |
| GB | 2259787 A | 3/1993 |

OTHER PUBLICATIONS

International Search Report dated Dec. 18, 2017 for CN2017116919 (pp. 1-5).

* cited by examiner

MULTIFUNCTIONAL SUPPORT BRACKET AND AN ASSEMBLY THEREOF

CROSS-REFERENCE TO RELATED APPLICATION

This is a US National Stage entry of a PCT application number PCT/CN2017/116919, filed on Dec. 18, 2017, which claims priority to a Chinese patent application 201711261155.0, filed on Dec. 4, 2017, whose disclosures are incorporated by reference in its entirety.

TECHNICAL FIELD

Embodiments of the invention relate to the technical field of auxiliary devices for photo-taking and video-taking, and in particular relates to a multifunctional support bracket and an assembly thereof.

BACKGROUND

A tripod is used for stablizing a camera in order to obtain certain photographing effects. In the industry of broadcasting and film, a camera is mounted on a ball head which is mounted on a tripod. A light-weight tripod with detachable ball-head in the prior art comprises a cylindrical ball platform and a ball-hole screw bolt, wherein the cylindrical ball platform comprises a ball-shaped base, a base clamp-ring and a ball-hole locking member, and the ball-hole screw bolt comprise a locking screw rod and large-cap screw nut. After the ball-shaped base on a lower end of the cylindrical ball platform is connected to a bracket connector in a hinged manner, the base clamp-ring is reversely clamped on a bottom thereof. A top portion of the cylindrical ball platform is inject-molded with a half ball-hole member, mutually corresponding through-holes are opened in the half ball-hole member and the ball-hole locking member, tension spring limiting holes are internally arranged on both lateral sides of the through-hole on an inner side. By allowing the locking screw rod to pass through the through-holes in the half ball-hole member and the ball-hole locking member and then to be tightened and fixed by the large-cap screw nut on the side of the ball-hole locking member, the light-weight tripod with detachable ball-head is provided with a ball-shaped concave structure formed by piecing together the half ball-hole member and the ball-hole locking member.

A ball head includes a flat-bottomed ball head and a spherical-bottomed ball head. The light-weight tripod with detachable ball-head in the above-mentioned prior art may only be applied to a spherical-bottomed ball head, but cannot be applied to a flat-bottomed ball head. In a tripod for a flat-bottomed ball head in the prior art, a flat-bottomed ball head is fixedly connected on top of the tripod, and such a tripod likewise cannot be applied to a spherical-bottomed ball head. Therefore, the tripods in the prior art cannot be applied to both of the flat-bottomed ball head and the spherical-bottomed ball head, and thus have poor versatility.

SUMMARY

Therefore, the technical problem to be solved by the embodiments of the invention is how to overcome the problem that the existing tripods have poor versatility and cannot be applied to both flat-bottomed ball head and spherical-bottomed ball head, by providing a multifunctional support bracket with good versatility and applicable to both of the flat-bottomed ball head and the spherical-bottomed ball head.

In order to solve the above-mentioned problem, the embodiments of the invention provides a multifunctional support bracket which comprises a main body; a spherical base, arranged on an upper part of the main body, having a spherical concave shape with an upward-facing opening, and provided with a cooperation member for being fixedly connected to a spherical-bottomed ball head; a flat-bottomed platform, having one side face detachably fixed to the opening of the spherical base through the cooperation member, and having the other side face provided with a connection member for being fixedly connected to a flat-bottomed ball head.

The flat-bottomed platform and the spherical base are disposed coaxially.

The cooperation member comprises a through-hole and a connector arranged at a bottom of the spherical base.

The connector is a handle with internal screw thread.

A fixing rod is provided on one side face of the flat-bottomed platform, and the fixing rod is arranged to pass through the through-hole and be fixed to the spherical base via the connector.

The flat-bottomed platform and the spherical base have fitting support surfaces for the spherical base to support the flat-bottomed platform on the spherical base.

The spherical base is provided with a limiting element, and the flat-bottomed platform is provided with a limiter which cooperates with the limiting element to prevent the flat-bottomed platform from rotating relative to the spherical base.

The limiting element is a groove extending radially outward along the inner surface of the spherical base, and the limiter is a protrusion provided on the flat-bottomed platform for snap-fitting with the groove.

The multifunctional support bracket further comprises a fastening member provided on the flat-bottomed platform for abutting against the flat-bottomed ball head.

The fastening member is disposed around the center of the flat-bottomed platform.

The axis of the fastening member intersects the axis of the flat-bottomed platform at a point on the upper side of the flat-bottomed platform.

The flat-bottomed platform is provided with a fastening hole for the fastening member to pass through from the lower side to the upper side or from a side wall to the upper side.

The spherical base is provided with an evasive hole, and the fastening member is mounted onto the flat-bottomed platform through the evasive hole.

The axis of the evasive hole coincides with the axis of the fastening hole.

The fastening member is connected to the flat-bottomed platform by a threaded connection.

A hook assembly is provided on a lower part of the handle and is flexibly or rigidly connected to the handle, the hook assembly is provided with a tightening member for screw-tightening the fastening member.

The hook assembly comprises a suspension member, for providing suspension, which is connected with the tightening member through a connecting column; a mounting member sleeved on the connecting column and detachably fixed to the handle; a resilient member sleeved on the connecting column and having one end abutting against the mounting member and the other end abutting against the tightening member.

The handle is provided with an inner cavity for accommodating the tightening member, and one end of the inner cavity away from the handle is detachably fixedly connected to the mounting member.

The embodiments of the invention provide a support bracket assembly which comprises the aforementioned multifunctional support bracket and further comprises a flat-bottomed ball head, fixedly connectable to the connection member of the flat-bottomed platform; or a spherical-bottomed ball head, for being fixed in the spherical base after the flat-bottomed platform is removed, and detachably fixedly connected to the cooperation member of the spherical base.

The flat-bottomed ball head is connected to the connection member by a threaded connection.

The spherical-bottomed ball head is provided with a screw rod for cooperating with the cooperation member.

The technical scheme of the embodiments of the invention has the following advantages:

The multifunctional support bracket of the embodiments of the invention comprises a main body; a spherical base, arranged on an upper part of the main body, having a spherical concave shape with an upward-facing opening, and provided with a cooperation member for being fixedly connected to a spherical-bottomed ball head; a flat-bottomed platform, having one side face detachably fixed to the opening of the spherical base through the cooperation member, and having the other side face provided with a connection member for being fixedly connected to a flat-bottomed ball head. With the multifunctional support bracket of the embodiments of the invention, when a flat-bottomed ball head is used, the flat-bottomed ball head may be fixedly connected to the connection member of the flat-bottomed platform; when a spherical-bottomed ball head is used, firstly, the flat-bottomed platform is removed from the spherical base, then, the spherical-bottomed ball head may be fixedly connected to the spherical base via the cooperation member, that is to say, the multifunctional support bracket of the embodiments of the invention may be applied to both of the flat-bottomed ball head and the spherical-bottomed ball head according to use requirements, with better versatility.

In the multifunctional support bracket of the embodiments of the invention, the flat-bottomed platform and the spherical base are disposed coaxially, so that the gravity centers of the flat-bottomed platform and the spherical base are on the same straight line, and such an arrangement may make the flat-bottomed platform more stable after the flat-bottomed platform is connected on the spherical base.

In the multifunctional support bracket of the embodiments of the invention, the cooperation member comprises a through-hole and a connector arranged at a bottom of the spherical base, a fixing rod is provided on one side face of the flat-bottomed platform, and the fixing rod is arranged to pass through the through-hole and be fixed to the spherical base via the connector. When a flat-bottomed ball head is used, the fixing rod provided on the flat-bottomed platform is allowed to pass through the through-hole and be fixed to the spherical base via the connector; when a spherical-bottomed ball head is used, firstly, the flat-bottomed platform is removed from the spherical base, then, the screw rod provided on a lower part of the spherical-bottomed ball head is allowed to pass through the through-hole, and the spherical-bottomed ball head is fixedly connected to the spherical base via the connector. Therefore, switching between the spherical-bottomed ball head and the flat-bottomed ball head on the spherical base may be achieved by only using the through-hole and the connector of the cooperation member, which is easy to switch and convenient to operate, with stable structure and low cost.

In the multifunctional support bracket of the embodiments of the invention, the fitting support surfaces, for the spherical base to support the flat-bottomed platform on the spherical base, is able to restrain the position of the flat-bottomed platform on the spherical base, so as to increase the stability of the flat-bottomed platform on the spherical base and prevent the flat-bottomed platform from slipping out of the spherical base from the opening of the spherical base.

In the multifunctional support bracket of the embodiments of the invention, the spherical base is provided with a limiting element, and the flat-bottomed platform is provided with a limiter which cooperates with the limiting element, so as to prevent the flat-bottomed platform from rotating relative to the spherical base.

In the multifunctional support bracket of the embodiments of the invention, the limiting element is a groove extending radially outward along the inner surface of the spherical base, and the limiter is a protrusion provided on the flat-bottomed platform for snap-fitting with the groove, thereby preventing the flat-bottomed platform from rotating relative to the spherical base. The snap-fitting of the protrusion and the groove have a simple structure, low cost and is convenient to operate.

The multifunctional support bracket of the embodiments of the invention further comprises a fastening member provided on the flat-bottomed platform for abutting against the flat-bottomed ball head, so as to restrain the movement of the flat-bottomed ball head on the flat-bottomed platform, increase the torque securing the flat-bottomed ball head on the flat-bottomed platform, prevent the flat-bottomed ball head from getting loose from the connector, and thus achieve a firmer connection between the flat-bottomed ball head and the connector.

In the multifunctional support bracket of the embodiments of the invention, a hook assembly is provided on a lower part of the handle for hanging objects, the hook assembly is provided with a tightening member for screw-tightening the fastening member. By providing the hook assembly together with the handle, on one hand, the hook assembly is made convenient to be carried around, on the other hand, when the fastening member is tightened, the necessity to find another apparatus for tightening is avoided, and a more convenient operation of tightening the fastening member may be achieved.

In the multifunctional support bracket of the embodiments of the invention, the hook assembly comprises a tightening member, a connecting column, a suspension member, a mounting member and a resilient member. The tightening member is for tightening the fastening member; the suspension member is connected with the tightening member through a connecting column, and is for hanging objects; the mounting member is sleeved on the connecting column, and is detachably fixed to the handle, so as to mount the hook assembly on the handle; the resilient member is sleeved on the connecting column, and has one end abutting against the mounting member and the other end abutting against the tightening member. When the hook assembly is not being used, the hook assembly is in an initial position; when an object is hung onto the suspension member, the suspension member moves downward, the hook assembly is changed from the initial position to a working position, and the tightening member moves downward along with the suspension member to compress the resilient member; when the use of the suspension member is finished, the tightening member is moved upward by the elastic force of the resilient member, so as to bring the suspension member to move into the initial position, that is to say, there is no need to manually restore the suspension member to the initial position, thereby making the use of the hook assembly more convenient. Under the condition that the hook assembly is not used, the hook assembly may be demounted from the handle, so that the hook assembly becomes an independent component, thereby reducing the number of components on the multifunctional support bracket and thus reducing the weight of the multifunctional support bracket.

The support bracket assembly of the embodiments of the invention comprises the aforementioned multifunctional support bracket, therefore, the support bracket assembly likewise has the same advantages as the aforementioned multifunctional support bracket.

BRIEF DESCRIPTION OF THE DRAWINGS

In order to more clearly describe the technical solutions in the embodiments of the present invention, hereinafter, the accompanying drawings required to be used for describing the specific embodiments or the prior art will be briefly introduced. Apparently, the accompanying drawings described below are only directed to some embodiments of the present invention, and for a person skilled in the art, without expenditure of creative labor, other drawings may be derived on the basis of these accompanying drawings.

DETAILED DESCRIPTION

Reference Numerals

Figure 1:
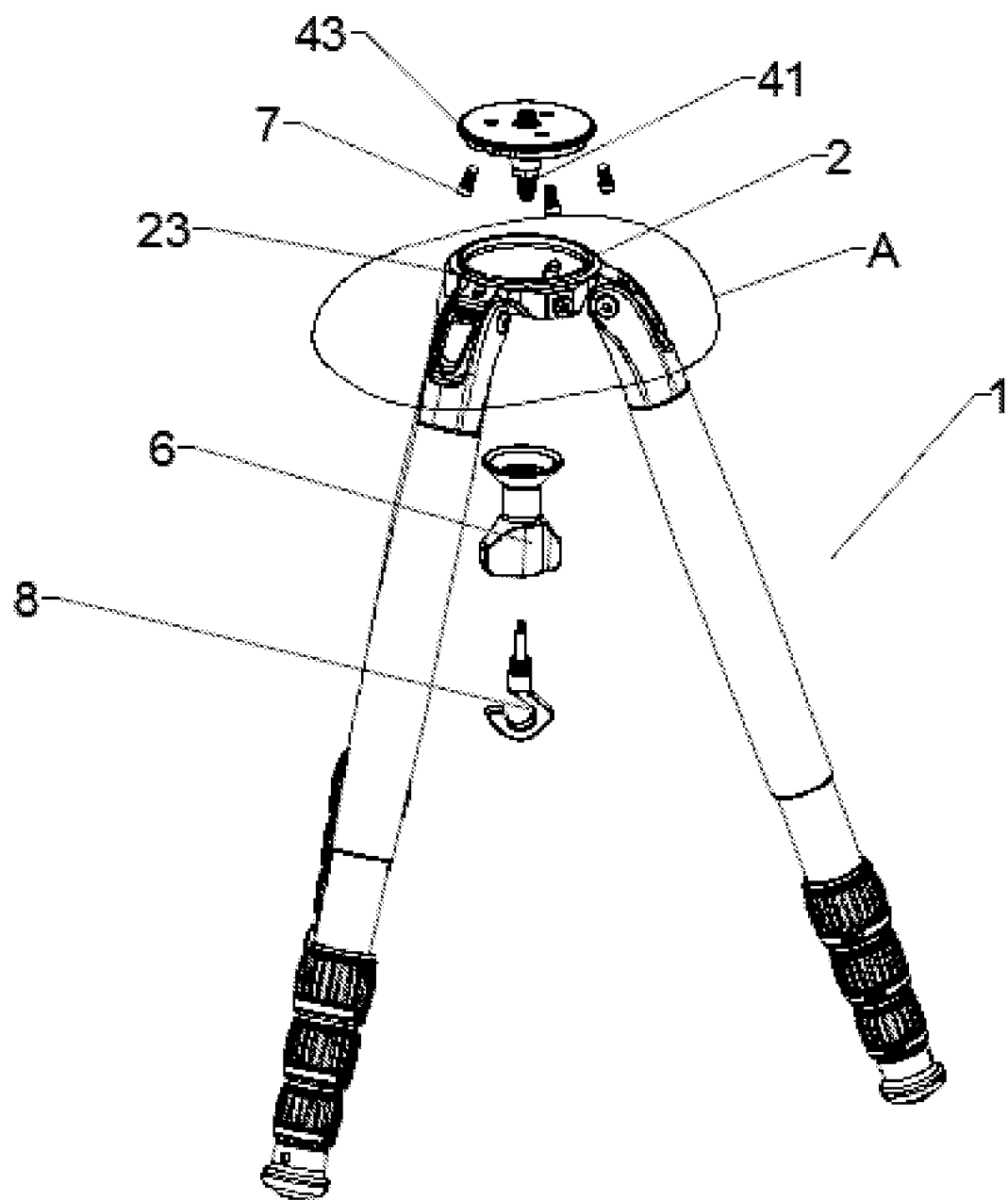
FIG. 1 is a structural schematic diagram of an exploded view of an embodiment of the present invention.
Figure 2:
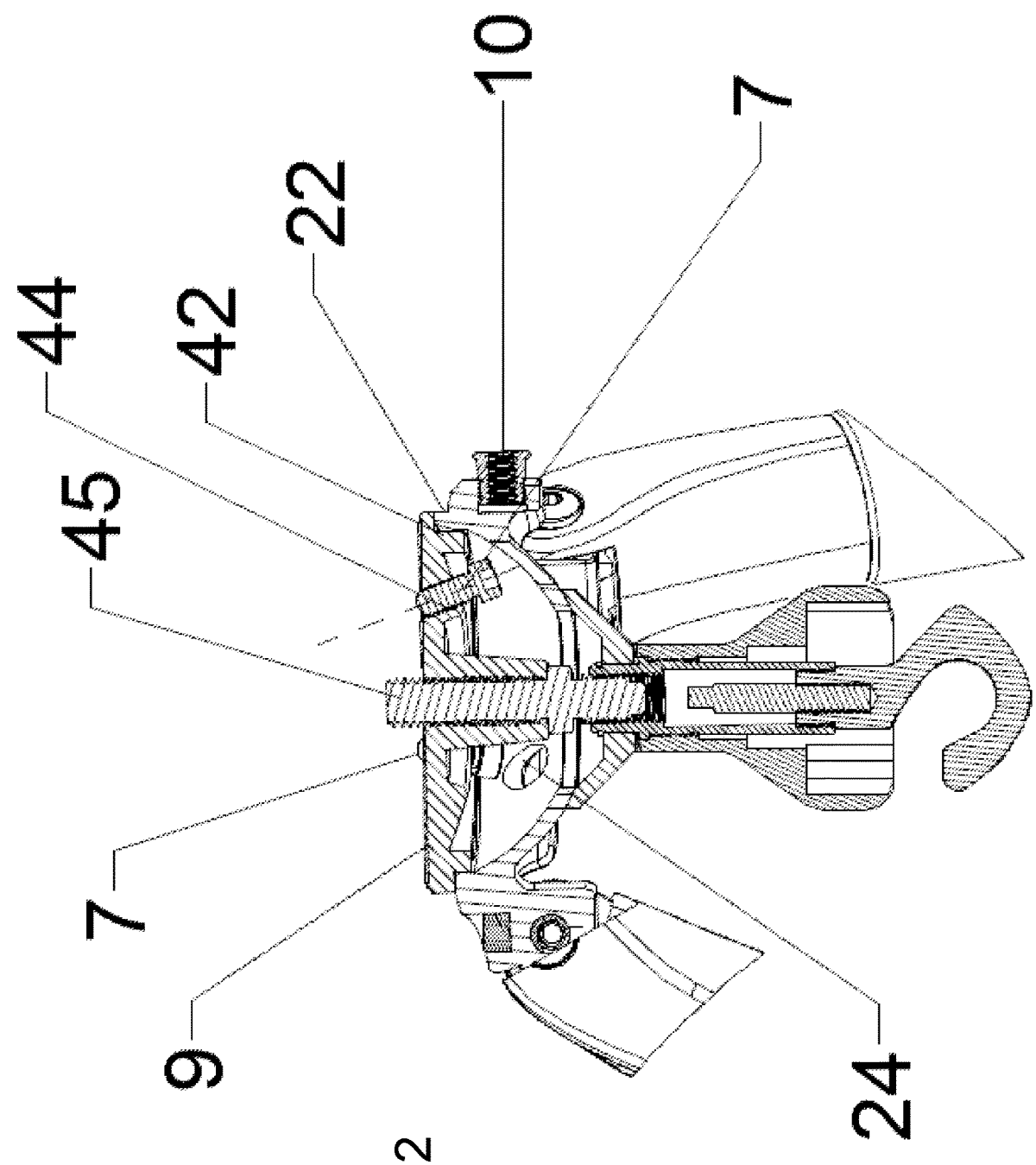
FIG. 2 is a sectional schematic diagram of a front view of part A in FIG. 1.
Figure 3:
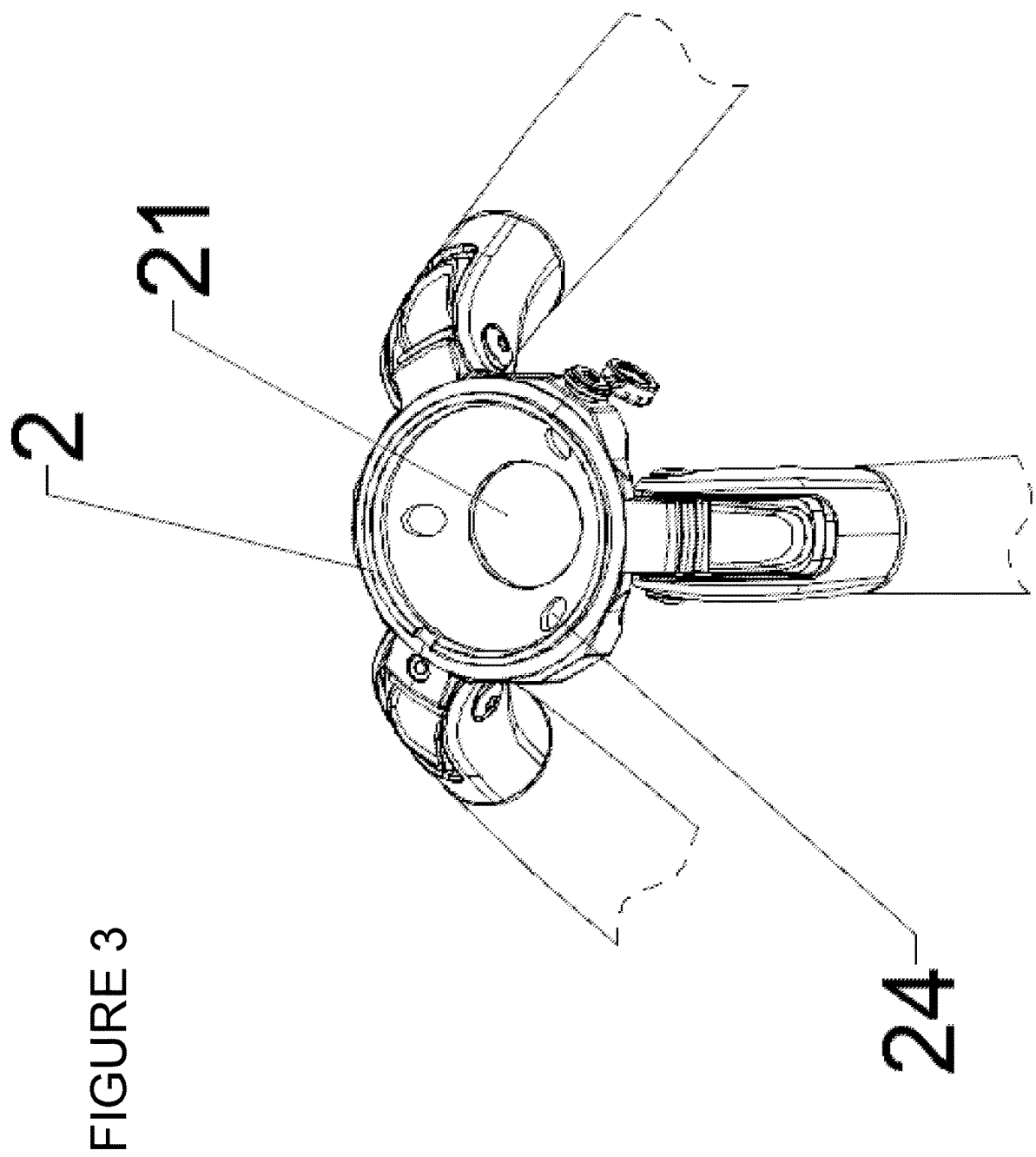
FIG. 3 is a structural schematic diagram of a top view of part A in FIG. 1.
Figure 4:
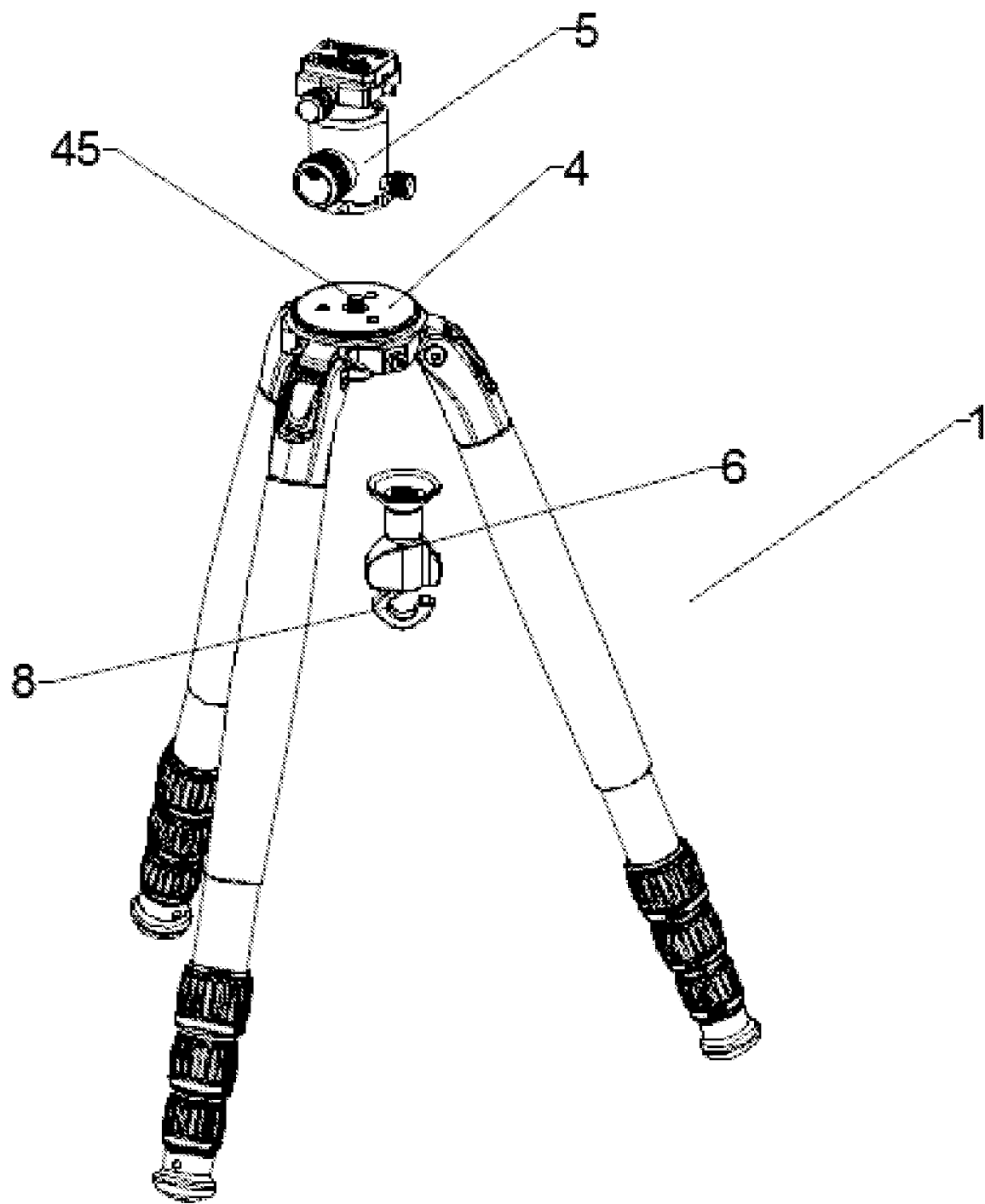
FIG. 4 is a structural schematic diagram of a flat-bottomed ball head and a support bracket of an embodiment of the present invention.
Figure 5:
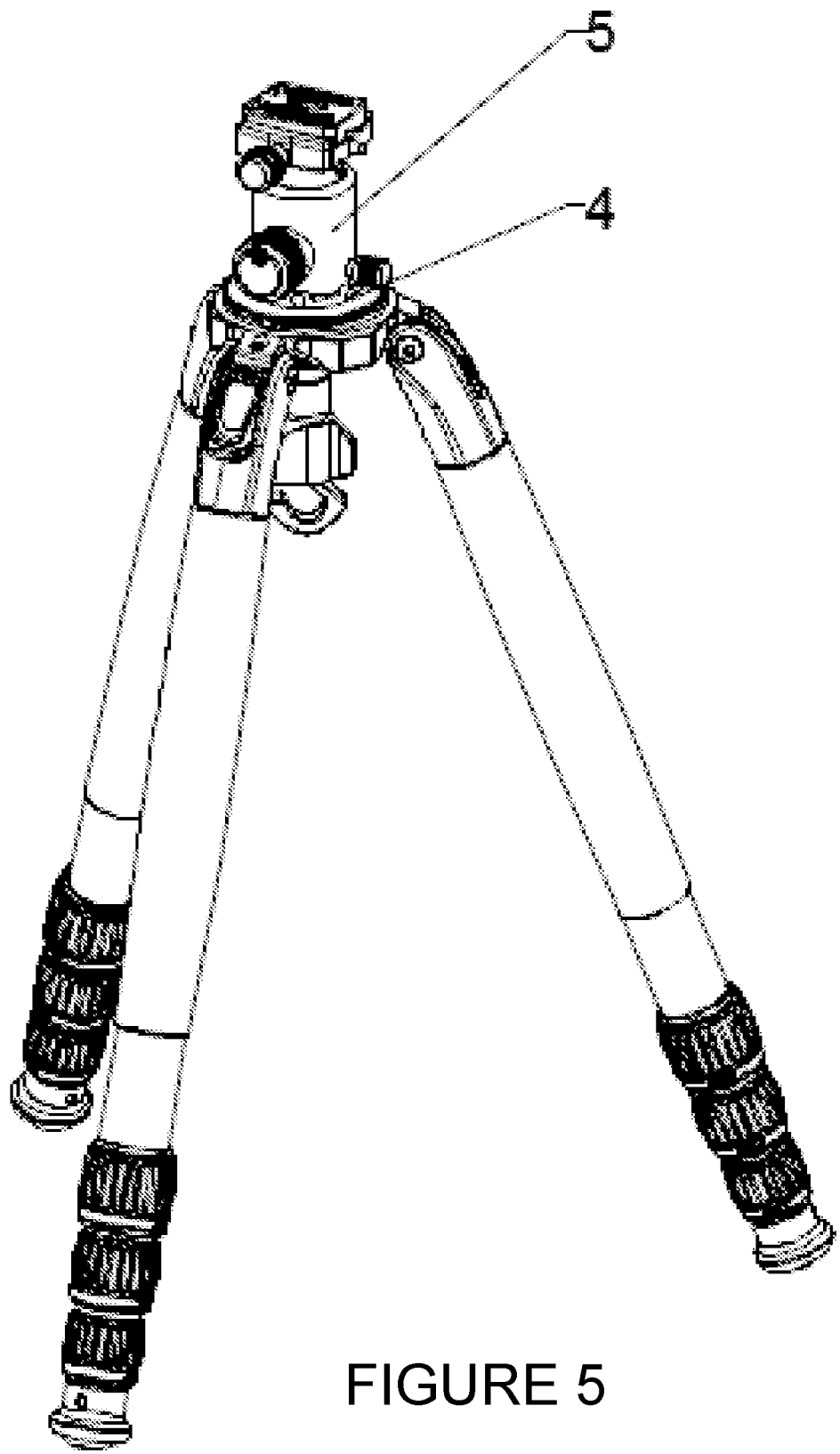
FIG. 5 is a stereoscopic schematic diagram of a flat-bottomed ball head connected on a support bracket of an embodiment of the present invention.
Figure 6:
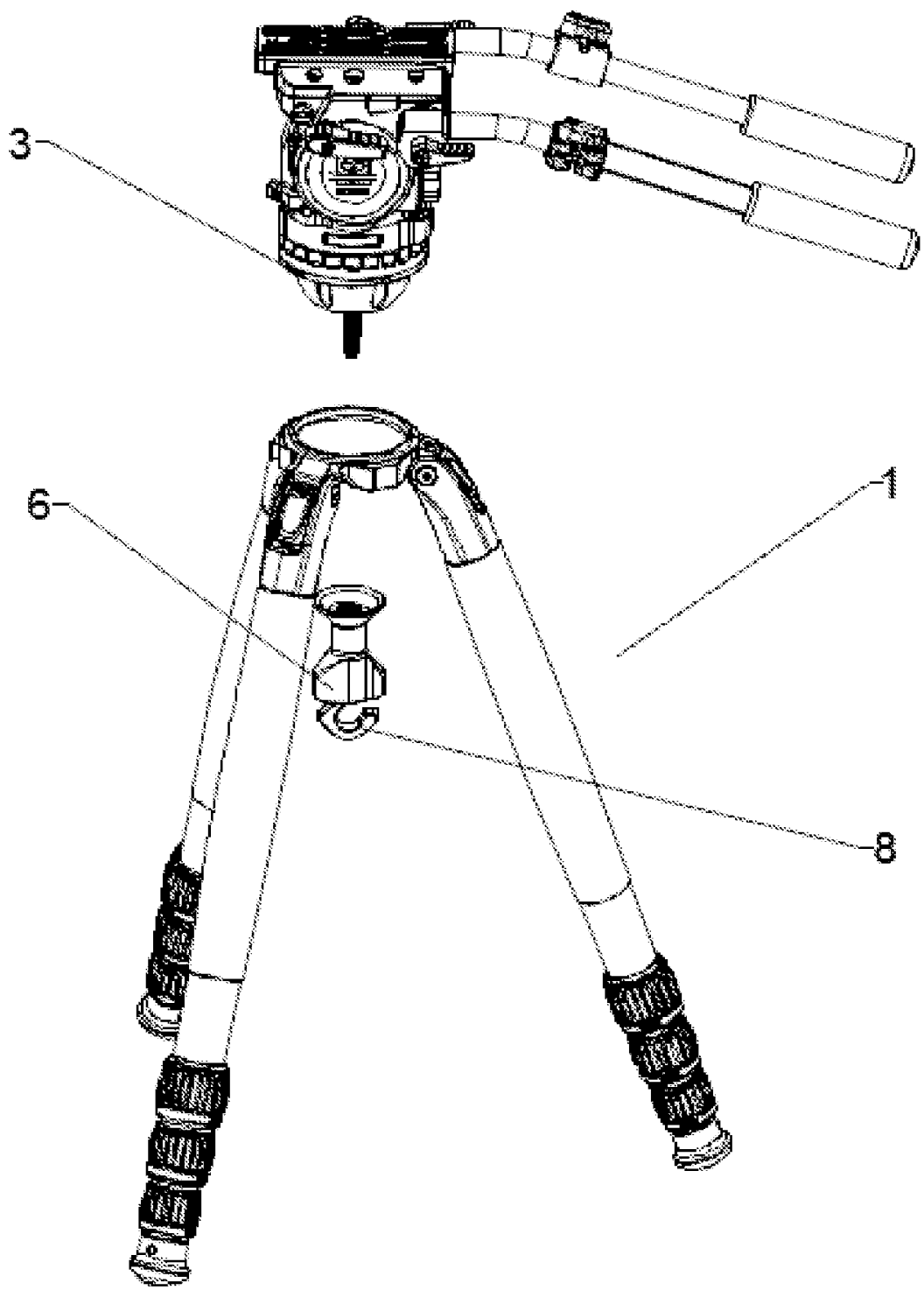
FIG. 6 is a structural schematic diagram of a spherical-bottomed ball head and a support bracket of an embodiment of the present invention.
Figure 7:
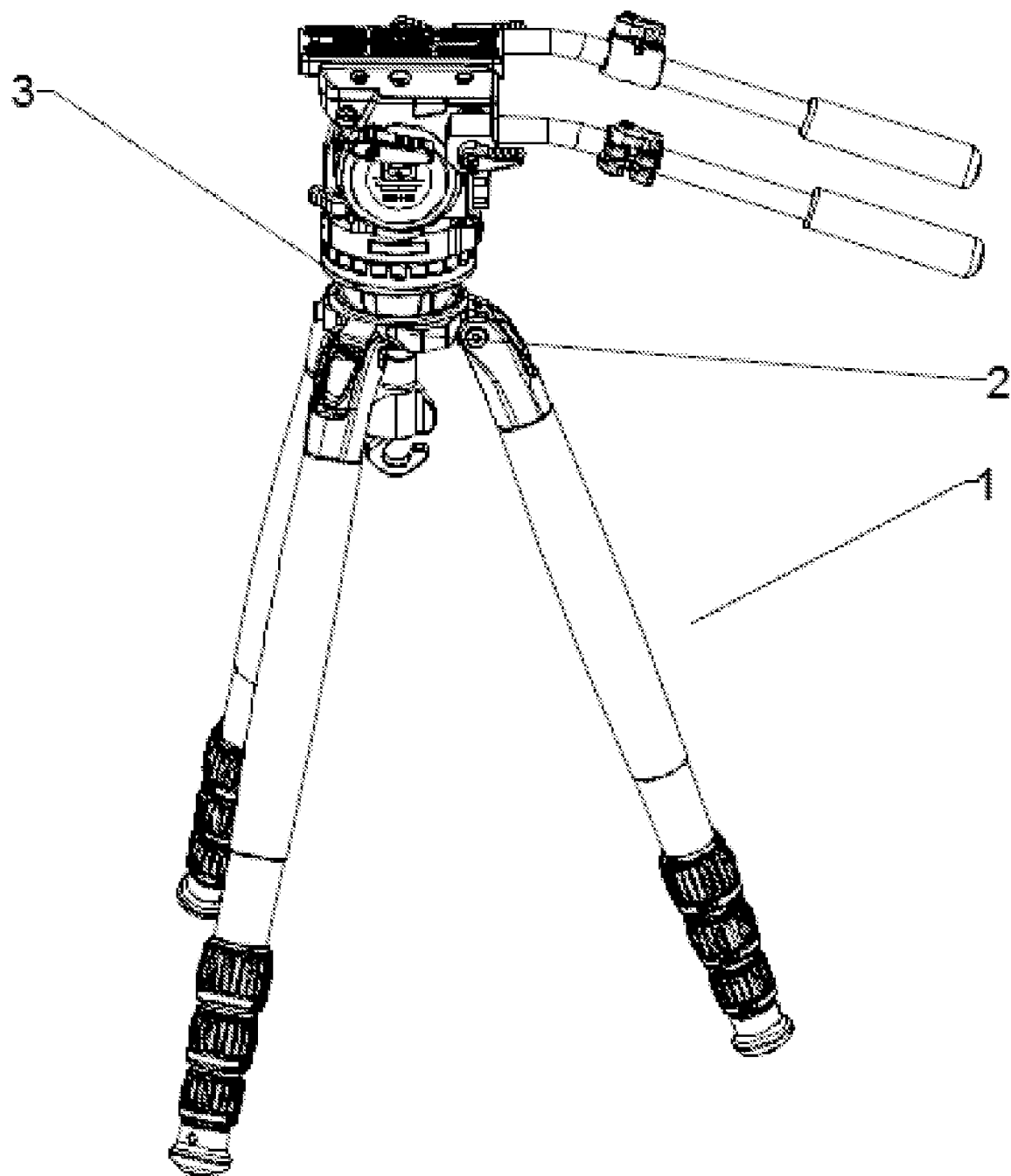
FIG. 7 is a stereoscopic schematic diagram of a spherical-bottomed ball head connected on a support bracket of an embodiment of the present invention.
Figure 8:
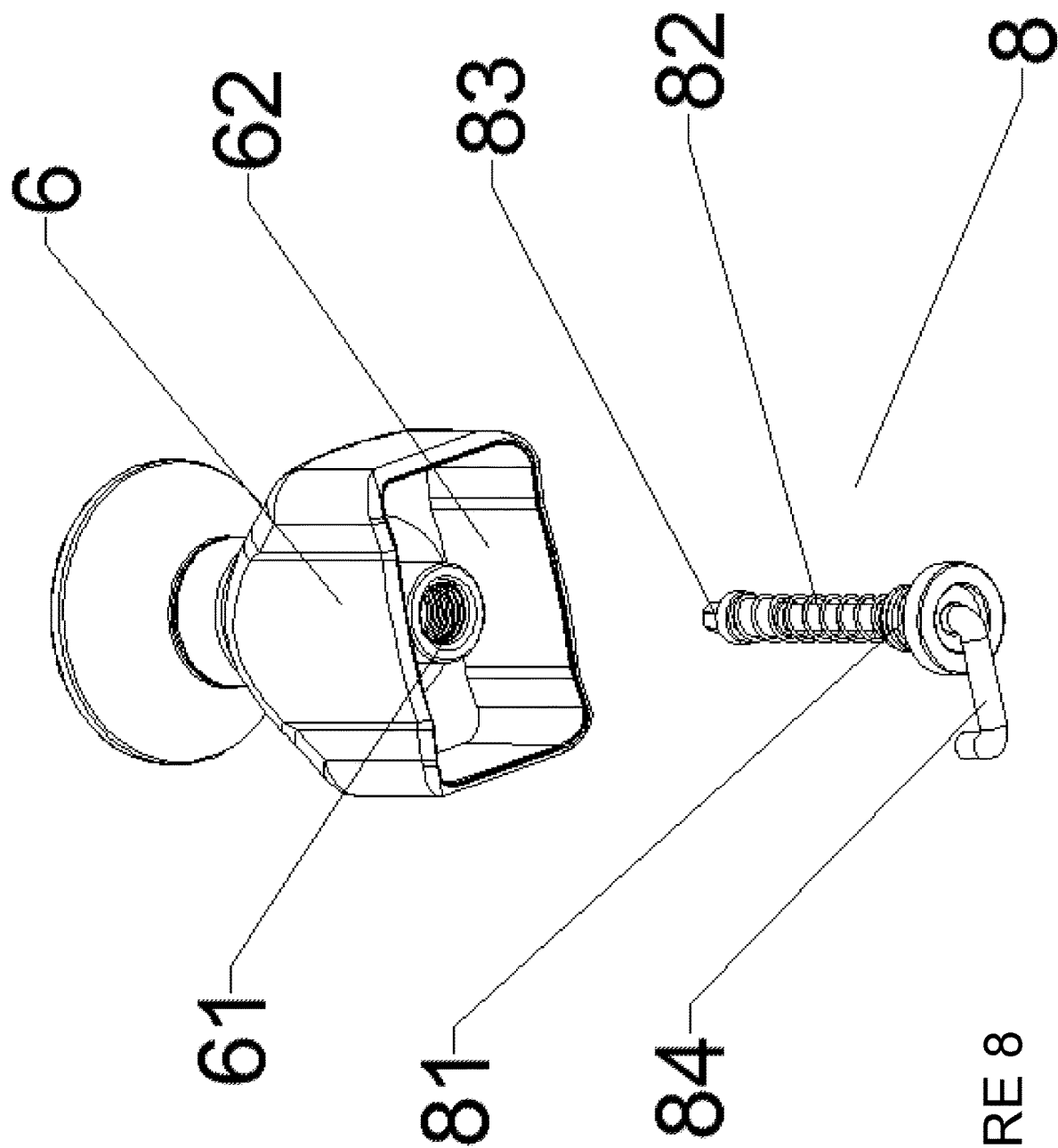
FIG. 8 is a structural schematic diagram of a stereoscopic view of a handle and a hook assembly of an embodiment of the present invention.

1—main body
2—spherical base
21—through-hole
22—boss
23—groove
24—evasive hole
3—spherical-bottomed ball head
4—flat-bottomed platform
41—fixing rod
42—recess
43—protrusion
44—fastening hole
45—connection member
5—flat-bottomed ball head
6—handle
61—inner cavity
62—accommodation chamber
7—fastening member
8—hook assembly
81—mounting member
82—resilient member
83—tightening member
84—suspension member
9—anti-slip mat
10—threaded connection opening A clear and complete description of the technical solutions of the embodiments of the present invention is given below, in conjunction with the accompanying drawings. Apparently, the embodiments described below are part of, but not all of, the embodiments of the present invention. All the other embodiments, obtained by a person skilled in the art on the basis of the embodiments described in the present invention without expenditure of creative labor, belong to the protection scope of the present invention.

In the description of the embodiments of the invention, it needs to be noted that, terms such as "center", "above", "below", "left", "right", "vertical", "horizontal", "inside", "outside" refer to the orientation or positional relation based on the illustration of the drawings, which is merely for facilitating and simplifying the description of the embodiments of the invention, not for indicating or implying that the referred apparatus or component must have a particular orientation or must be configured or operated in a particular orientation, therefore is not to be construed as a limitation towards the embodiments of the invention.

A multifunctional support bracket in the embodiment as shown in FIGS. 1-8 comprises a main body 1, a spherical base 2 and a flat-bottomed platform 4.

The spherical base 2 is arranged on an upper part of the main body 1, has a spherical concave shape with an upward-facing opening, and is provided with a cooperation member for being fixedly connected to a spherical-bottomed ball head 3.

The flat-bottomed platform 4 has one side face detachably fixed to the opening of the spherical base 2 through the cooperation member, and has the other side face provided with a connection member 45 for being fixedly connected to a flat-bottomed ball head 5.

With the multifunctional support bracket of this embodiment, when a flat-bottomed ball head 5 is used, the flat-bottomed ball head 5 may be fixedly connected to the connection member of the flat-bottomed platform 4; when a spherical-bottomed ball head 3 is used, firstly, the flat-bottomed platform 4 is removed from the spherical base 2, then, the spherical-bottomed ball head 3 is put into the spherical concave shaped part of the spherical base 2, and the spherical-bottomed ball head 3 is fixedly connected to the spherical base 2 via the cooperation member, that is to say, the multifunctional support bracket of the embodiments of the invention may be applied to both flat-bottomed ball head 5 and spherical-bottomed ball head 3 according to use requirements, with better versatility.

In this embodiment, the flat-bottomed platform 4 and the spherical base 2 are disposed coaxially. The gravity centers of the spherical base 2 and the flat-bottomed platform 4 are on the same axis, and therefore, such an arrangement may make the flat-bottomed platform 4 more stable after the flat-bottomed platform is connected on the spherical base 2. Of course, the axis of the flat-bottomed platform 4 may also have some deviation from the axis of the spherical base, which does not affect the use, but this is not aesthetic and would negatively affect the stability of the multifunctional support bracket.

The cooperation member comprises a through-hole 21 and a connector arranged at a bottom of the spherical base 2. A fixing rod 41 is provided on one side face of the flat-bottomed platform 4, and the fixing rod 41 is arranged to pass through the through-hole 21 and be fixed to the spherical base 2 via the connector. In this embodiment, in order to facilitate the use of the cooperation member, the connector is a handle 6 with internal screw thread, and the fixing rod 41 is provided with exterior screw thread adapted to cooperate with the handle 6, so that the fixing rod 41 is connected to the handle 6 by a threaded connection.

The flat-bottomed platform 4 and the spherical base 2 have fitting support surfaces, which are mutually abutting surfaces on the flat-bottomed platform 4 and the spherical base 2, for preventing the flat-bottomed platform 4 from slipping out of the spherical base 2 from the opening of the spherical base 2, and in this embodiment, also for preventing the spherical base 2 from slipping out of the spherical base 2 from the opening of the spherical base 2. The fitting support surfaces may be a lateral surface of the flat-bottomed platform 4 and an inner surface of the spherical base 2. Of course, it may also be cooperation between a boss 22 and a recess 42, wherein a circular boss 22 extending outward along an outer surface of the spherical base 2 is provided at the opening of the spherical base 2, and a recess 42 for fitting with the circular boss 22 is provided on an inner surface of the flat-bottomed platform 4. The fitting between the boss 22 and the recess restrains the fixing position of the flat-bottomed platform 4 on the spherical base 2, so as to increase the stability of the flat-bottomed platform 4 fixed on the spherical base 2, with simple structure and low cost.

In this embodiment, in order to prevent the flat-bottomed platform 4 from rotating relative to the spherical base 2, the spherical base 2 is provided with a limiting element, and the flat-bottomed platform 4 is provided with a limiter which cooperates with the limiting element. A specific structure may be that the limiting element is a groove 23 extending radially outward along the inner surface of the spherical base 2, and the limiter is a protrusion 43 provided on the flat-bottomed platform 4 for snap-fitting with the groove 23.

The multifunctional support bracket also comprises a fastening member 7 provided on the flat-bottomed platform 4 for abutting against the flat-bottomed ball head 5. The angle between the fastening member and the axis of the flat-bottomed platform 4 may be arranged according to model types or customer requirements, for example, it may be arranged to be 0°, 21°, 30°, 45°, 90°. In this embodiment, fastening members 7 are disposed around the center of the flat-bottomed platform 4, the axis of the fastening member 7 intersects the other side face of the flat-bottomed platform at a certain angle and intersects the axis of the flat-bottomed platform 4 at a point on the upper side of the flat-bottomed platform 4. The flat-bottomed platform 4 is provided with a fastening hole 44 for the fastening member 7 to pass through from the lower side to the upper side. Of course, the arrangement of the fastening hole is not limited to this, the fastening hole 44 may also be arranged to allow the fastening member 7 to pass through from a side wall to the upper side of the flat-bottomed platform 4; and under the condition that the fastening member 7 is not required to extend out, the top of the fastening member 7 does not extend out of the flat-bottomed platform 4. In this embodiment, as shown in FIG. 1, there are three fastening members 7. Of course, there may also be two or four fastening members 7, as long as they are evenly distributed. The fastening member 7 is connected to the flat-bottomed platform 4 by a treaded connection.

The spherical base 2 is provided with an evasive hole 24, and the fastening member 7 is mounted onto the flat-bottomed platform 4 through the evasive hole 24. In order to facilitate mounting the fastening member 7, in this embodiment, the axis of the evasive hole 24 coincides with the axis of the fastening hole 44. Of course, there may be a slight deviation, which does not affect the use but is not aesthetic.

A hook assembly 8 is provided on a lower part of the handle 6 and is flexibly connected to the handle 6. Of course, the hook assembly 8 may also be rigidly connected to the handle 6, for example by a threaded connection.

The hook assembly 8 comprises a tightening member 83, a suspension member 84, a mounting member 81 and a resilient member 82.

The tightening member 83 is for tightening the fastening member 7.

The suspension member is for hanging objects, and is connected with the tightening member 83 through a connecting column.

The mounting member 81 is sleeved on the connecting column, and is detachably fixed to the handle 6.

The resilient member 82 is sleeved on the connecting column, and has one end abutting against the mounting member 81 and the other end abutting against the tightening member 83. In this embodiment, the resilient member 82 is a compression spring.

When the hook assembly 8 is not being used, the hook assembly 8 is in an initial position; when an object is hung onto the suspension member 84, the suspension member 84 moves downward, the hook assembly 8 is changed from the initial position to a working position, and the tightening member 83 moves downward along with the suspension member 84 to compress the resilient member 82; when the use of the suspension member 84 is finished, the tightening member 83 is moved upward by the elastic force of the resilient member 82, so as to bring the suspension member 84 to move into the initial position, that is to say, there is no need to manually restore the suspension member 84 to the initial position, thereby making the use of the hook assembly 8 more convenient. Under the condition that the hook assembly 8 is not used, the hook assembly 8 may be demounted from the handle 6, so that the hook assembly 8 becomes an independent component, thereby reducing the number of components on the multifunctional support bracket and thus reducing the weight of the multifunctional support bracket.

The lower part of the handle 6 is provided with an accommodation chamber 62 for receiving the hook assembly 8, and is also provided with an inner cavity 61 for receiving the tightening member 83. One end of the inner cavity 61 away from the handle 6 is detachably fixedly connected to the mounting member 81, and the tightening member 83 may move inside the inner cavity 61. In this embodiment, the end of the inner cavity 61 away from the handle 6 is provided with internal screw thread, and one end of the mounting member 81 adjacent to the handle 6 is provided with external screw thread, thereby the mounting member 81 is connected to the handle 6 by a threaded connection. In order for the mounting member 81 to be connected to the handle 6 by a threaded connection, one end of the mounting member 81 away from the external screw thread is provided with a flange boss having a diameter larger than the diameter of the external screw thread, so that the mounting member 81 may be connected onto the handle 6 with a threaded connection conveniently by rotating the flange boss.

A support bracket assembly according to the embodiment comprises the aforementioned support bracket and further comprises a flat-bottomed ball head 5 and a spherical-bottomed ball head 3.

The connection member 45 on the upper side of the center of the flat-bottomed platform 4 is a screw bolt, and the flat-bottomed ball head 5 is connected to the connection member 45 of the flat-bottomed platform 4 by a threaded fastening connection.

In this embodiment, the upper side of the flat-bottomed platform 4 is also provided with an anti-slip mat 9 and a bubble leveler, wherein, the anti-slip mat 9 is for increasing the friction force between the flat-bottomed ball head 5 and the flat-bottomed platform 4, so that the flat-bottomed ball head 5 is more stably connected on the flat-bottomed platform 4. The leveling of the flat-bottomed platform 4 may be adjusted by directly observing the bubble leveler, so as to ensure the levelness of the ball head.

After the flat-bottomed platform 4 is removed from the spherical base 2, the spherical-bottomed ball head 3 may be put inside the spherical base 2. The spherical-bottomed ball head 3 is provided with a screw rod for cooperating with the cooperation member, by allowing the screw rod to pass through the through-hole 21 of the cooperation member and be fixed to the spherical base 2 via the connector.

In this embodiment, a threaded connection opening 10 is provided in a lateral wall of the spherical base 2. When the threaded connection opening 10 is needed for mounting and fastening a component onto the support bracket assembly, for example when a control cable of the flat-bottomed ball head 5 or the spherical-bottomed ball head 3 is fastened, the cable may be connected into the threaded connection opening 10 by a screw bolt, so that the control cable would not negatively affect the operation of the flat-bottomed ball head 5 or the spherical-bottomed ball head 3, and in this way the control cable is not messy and is aesthetic.

Apparently, the aforementioned embodiments are merely examples illustrated for clearly describing the present application, rather than limiting the implementation ways thereof. For a person skilled in the art, various changes and modifications in other different forms may be made on the basis of the aforementioned description. It is unnecessary and impossible to exhaustively list all the implementation ways herein. However, any obvious changes or modifications derived from the aforementioned description are intended to be embraced within the protection scope of the present application.

What is claimed is:

1. A multifunctional support bracket, characterized in comprising:
    a main body (1);
    a spherical base (2), arranged on an upper part of the main body (1), having a spherical concave shape with an upward-facing opening, and provided with a cooperation member for being fixedly connected to a spherical-bottomed ball head (3);
    a flat-bottomed platform (4), having one side face detachably fixed to the opening of the spherical base (2) through the cooperation member, and having the other side face provided with a connection member (45) for being fixedly connected to a flat-bottomed ball head (5);
    a plurality of fastening members (7), provided on the flat-bottomed platform (4) and disposed around the center of the flat-bottomed platform (4), for abutting against the flat-bottomed ball head (5), wherein the axis of each of the fastening members (7) intersects the axis of the flat-bottomed platform (4) at a point on the upper side of the flat-bottomed platform (4); and
    wherein the spherical base (2) is provided with a limiting element, and the flat-bottomed platform (4) is provided with a limiter which cooperates with the limiting element to prevent the flat-bottomed platform (4) from rotating relative to the spherical base (2).

2. The multifunctional support bracket of claim 1, characterized in that, the flat-bottomed platform (4) and the spherical base (2) are disposed coaxially.

3. The multifunctional support bracket of claim 1, characterized in that, the cooperation member comprises a through-hole (21) and a connector arranged at a bottom of the spherical base (2).

4. The multifunctional support bracket of claim 3, characterized in that, a fixing rod (41) is provided on one side face of the flat-bottomed platform (4), and the fixing rod (41) is arranged to pass through the through-hole (21) and be fixed to the spherical base (2) via the connector.

5. The multifunctional support bracket of claim 1, characterized in that, the flat-bottomed platform (4) and the spherical base (2) have fitting support surfaces for preventing the flat-bottomed platform (4) from slipping out of the spherical base (2) from the opening of the spherical base (2).

6. The multifunctional support bracket of claim 1, characterized in that, the limiting element is a groove (23) extending radially outward along the inner surface of the spherical base (2), and the limiter is a protrusion (43) provided on the flat-bottomed platform (4) for snap-fitting with the groove (23).

7. The multifunctional support bracket of claim 1, characterized in that, the flat-bottomed platform (4) is provided with a fastening hole (44) for the fastening member (7) to pass through from the lower side to the upper side or from a side wall to the upper side.

8. The multifunctional support bracket of claim 7, characterized in that, the spherical base (2) is provided with an evasive hole (24), and the fastening member (7) is mounted onto the flat-bottomed platform (4) through the evasive hole (24).

9. The multifunctional support bracket of claim 8, characterized in that, the axis of the evasive hole (24) coincides with the axis of the fastening hole (44).

10. The multifunctional support bracket of claim 1, characterized in that, the fastening member (7) is connected to the flat-bottomed platform (4) by a threaded connection.

11. The multifunctional support bracket of claim 1, characterized in that, the connector is a handle (6) with internal screw thread, a hook assembly (8) is provided on a lower part of the handle (6) and is flexibly or rigidly connected to the handle (6), the hook assembly (8) is provided with a tightening member (83) for screw-tightening the fastening member (7).

12. The multifunctional support bracket of claim 11, characterized in that, the hook assembly (8) comprises:
    a suspension member (84), for providing suspension, which is connected with the tightening member (83) through a connecting column;
    a mounting member (81) sleeved on the connecting column and detachably fixed to the handle (6);
    a resilient member (82) sleeved on the connecting column and having one end abutting against the mounting member (81) and the other end abutting against the tightening member (83).

13. The multifunctional support bracket of claim 12, characterized in that, the handle (6) is provided with an inner cavity (61) for accommodating the tightening member (83), and one end of the inner cavity (61) away from the handle (6) is detachably fixedly connected to the mounting member (81).

14. A support bracket assembly, characterized in comprising:
- a multifunctional support bracket according to claim 1; and further comprising:
- a flat-bottomed ball head (5), fixedly connectable to the connection member (45) of the flat-bottomed platform (4); or
- a spherical-bottomed ball head (3), for being fixed in the spherical base (2) after the flat-bottomed platform (4) is removed, and detachably fixedly connected to the cooperation member of the spherical base (2).

15. The support bracket assembly of claim 14, characterized in that, the flat-bottomed ball head (5) is connected to the connection member (45) by a threaded connection.

16. The support bracket assembly of claim 14, characterized in that, the spherical-bottomed ball head (3) is provided with a screw rod for cooperating with the cooperation member.

* * * * *